(12) United States Patent
Chu

(10) Patent No.: US 10,242,815 B1
(45) Date of Patent: Mar. 26, 2019

(54) PUSH SWITCH WITH A PICTURE LAYER THAT IS ONLY VISIBLE WHEN ILLUMINATED

(71) Applicant: Ching-Hsiung Chu, Taipei (TW)

(72) Inventor: Ching-Hsiung Chu, Taipei (TW)

(*) Notice: Subject to any disclaimer, the term of this patent is extended or adjusted under 35 U.S.C. 154(b) by 0 days.

(21) Appl. No.: 15/472,301

(22) Filed: Mar. 29, 2017

(51) Int. Cl.
| | |
|---|---|
| *H01H 13/02* | (2006.01) |
| *B05D 1/02* | (2006.01) |
| *C23C 18/31* | (2006.01) |
| *H01H 11/00* | (2006.01) |
| *H01H 13/14* | (2006.01) |
| *H01H 13/04* | (2006.01) |

(52) U.S. Cl.
CPC .......... *H01H 13/023* (2013.01); *B05D 1/02* (2013.01); *C23C 18/31* (2013.01); *H01H 11/00* (2013.01); *H01H 13/04* (2013.01); *H01H 13/14* (2013.01); *H01H 2219/028* (2013.01); *H01H 2221/07* (2013.01)

(58) Field of Classification Search
CPC .............. H01H 13/023; H01H 13/14; H01H 13/83–2219/00; H01H 2219/028; H01H 2219/036; H01H 2221/07
USPC ................................. 200/310, 311, 313, 314
See application file for complete search history.

(56) References Cited

U.S. PATENT DOCUMENTS

| | | | | |
|---|---|---|---|---|
| 7,090,368 B2* | 8/2006 | Oross | ................... | G06F 1/1616 200/311 |
| 7,432,463 B2* | 10/2008 | Clegg | ................... | H01H 13/70 200/310 |
| 8,188,398 B2* | 5/2012 | Chu | ................... | H01H 13/023 200/312 |

* cited by examiner

*Primary Examiner* — Vanessa Girardi

(57) ABSTRACT

A push switch capable of indicating a push state comprises a cap, movable stand, base, connecting member, light-emitting module, resilient component, circuit unit, and casing. The cap comprises a surface layer onto which a first UV ink layer, translucent chromium-plated layer, and second UV ink layer are sprayed sequentially. The connecting member is light-penetrable and fitted to the bottom of the cap. The movable stand comprises a body, connecting end portion connected to the connecting member, and limiting portion extending laterally from the body. The movable stand moves whenever the cap is pushed. The base has therein a receiving space. The light-emitting module, resilient component, and circuit unit are disposed in the receiving space. After at least one light-emitting component of the light-emitting module has emitted light, brightness and color of the light emitted is visible through the cap to indicate the push state of the push switch.

10 Claims, 6 Drawing Sheets

PUSH SWITCH WITH A PICTURE LAYER THAT IS ONLY VISIBLE WHEN ILLUMINATED

BACKGROUND OF THE INVENTION

1. Field of the Invention

The present invention relates to push switches and, more particularly, to a push switch capable of indicating a push state and a method of manufacturing the same.

2. Description of the Prior Art

A conventional push switch essentially has a base and a movable button and works by a user's pressing the button so that positive and negative electrodes in the base come into contact with each other to achieve electrical conduction therebetween, thereby enabling and disabling a power source. The conventional push switch, which is operated by being gently touched by the user, is a microswitch—small in size and short in distance traveled by the button; as a result, the user is prevented from perceiving whether she or he has precisely pushed the push switch or not, thereby predisposing the push switch or even an application end product to damage caused by an instantaneous electric current. In an attempt to allow users to identify the push state of a push switch, manufacturers launched another modified conventional push switch which has a segmental feedback mechanism or a light-emitting module. As soon as a user pushes the push switch, the light-emitting module emits light. The light thus emitted is visible to the user through a light-penetrable button to indicate that the push switch has been precisely pushed. The button of the conventional push switch capable of emitting light from inside is light-penetrable and requires a manufacturing process which entails injecting a raw material and a dye together into a mold by injection molding. As a result, if the manufacturer finds that the light penetrability of the button manufactured is not up to standard, the manufacturer cannot correct the fault but will have to carry out the manufacturing process of the button again, thereby incurring a high manufacturing cost. Furthermore, the luster and wearproofing of the button is limited by the raw material for use in injection molding and technology related to injection molding.

SUMMARY OF THE INVENTION

The present invention provides a push switch capable of indicating a push state through internal light emission and equipped with a wearproof, luster-enhancing cap, and a method of manufacturing the same. The push switch moves vertically up and down when pushed and thereby is precisely turned on.

According to the present invention, the push switch capable of indicating a push state comprises: a cap being light-penetrable and comprising a surface layer, a first UV ink layer, a translucent chromium-plated layer, and a second UV ink layer, wherein the first UV ink layer, the translucent chromium-plated layer, and the second UV ink layer are sprayed onto the surface layer sequentially; a base having therein a receiving space, the receiving space having an end at which an opening is disposed; a connecting member fitted to a bottom of the cap, being light-penetrable, and concealing the opening of the receiving space fully; a movable stand comprising a body, a connecting end portion disposed at an end of the body, and a limiting portion disposed at another end of the body, the limiting portion extending laterally from the body and being disposed in the receiving space, the connecting end portion connecting with the connecting member, allowing the movable stand to move as soon as the cap is pushed; a light-emitting module disposed in the receiving space of the base, comprising at least one light-emitting component and conductive terminals, and electrically connected to an external circuit board; at least one resilient component disposed in the receiving space of the base, having an end pressing against the connecting member, and having another end pressing against a bottom of the base; and a circuit unit disposed in the receiving space of the base, electrically connected to the external circuit board, and adapted to turn on the push switch as a result of motion of the movable stand, control at least one application end product, and enable the at least one light-emitting component to emit light, wherein the light thus emitted is visible through the cap.

According to an embodiment of the push switch of the present invention, a picture layer is disposed between the cap and the connecting member and displays at least one picture or word which is visible through the cap because of the light emitted from the at least one light-emitting component and light penetrability of both the connecting member and the cap, and the picture layer is invisible through the cap when the at least one light-emitting component does not emit light.

According to another embodiment of the push switch of the present invention, the limiting portion of the movable stand comprises guide grooves each concavely formed on the limiting portion to longitudinally penetrate a top and bottom of the limiting portion, wherein posts are disposed on an inner wall surface of the base, correspond in position to the guide grooves, respectively, and extend longitudinally to a top and bottom of the base, with the guide grooves connecting slidably with the posts.

A method of manufacturing the push switch of the present invention comprises the steps of: providing a light-penetrable cap; wiping a surface layer of the cap with a chemical; drying the surface layer of the cap, followed by removing dust therefrom; spraying a first UV ink layer onto the surface layer of the cap, followed by curing the first UV ink layer; vacuum-plating a translucent chromium-plated layer on the cured first UV ink layer; spraying a second UV ink layer onto the translucent chromium-plated layer, followed by curing the second UV ink layer; providing a light-penetrable connecting member fitted to a bottom of the cap; providing a movable stand having therein a hollow core and having an end connected to the connecting member, thereby allowing the cap to connect with the movable stand; and providing a base having therein a receiving space, the receiving space having an end at which an opening is disposed, the receiving space having therein a light-emitting module, at least one resilient component, and a circuit unit, allowing the movable stand to be inserted into the receiving space through the opening and to connect slidably with the base, the connecting member concealing the opening. As soon as the cap is pushed, the movable stand presses on the at least one resilient component and moves downward to turn on the circuit unit and enable at least one light-emitting component of the light-emitting module to emit light. The brightness of the at least one light-emitting component is visible through the cap and indicative of a push state of the push switch.

The push switch of the present invention is characterized in that: the first UV ink layer, the translucent chromium-plated layer, and the second UV ink layer are formed on the surface layer sequentially by three spraying processes, respectively; light emitted from the at least one light-emitting component in the base is visible through the cap; the brightness of the light thus emitted and visible is greatly enhanced because of the luster of the translucent chromium-plated layer; and elements in the base are invisible through the cap in the absence of any light emitted from the at least one light-emitting component. Hence, the push switch of the present invention is effective in overcoming a drawback of a conventional push switch, that is, users are prevented from identifying the push state of the conventional push switch or product functions controlled by the conventional push switch. Furthermore, the engagement between the guide grooves and the posts not only ensures that the movable stand moves vertically up and down, but also ensures that, regardless of where on the cap a push is exerted, the movable stand does not end up in a diversion.

DETAILED DESCRIPTION OF THE EMBODIMENT OF THE INVENTION

Figure 3:
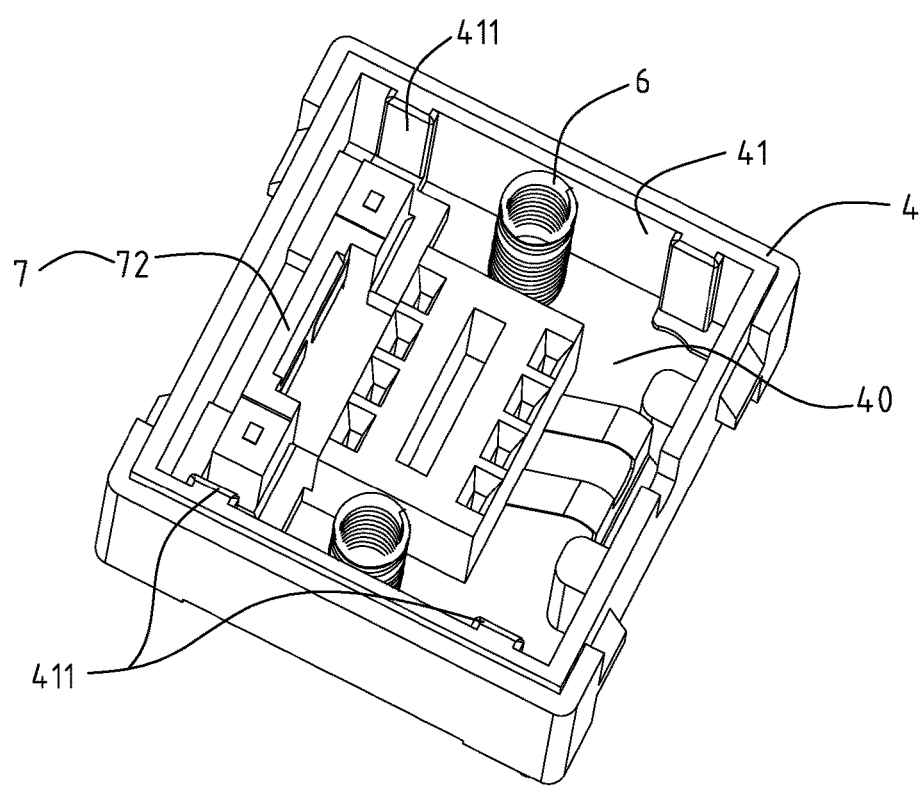
FIG. 3 is a perspective view of an assembled base shown in FIG. 1 and elements in the base.
Figure 4:
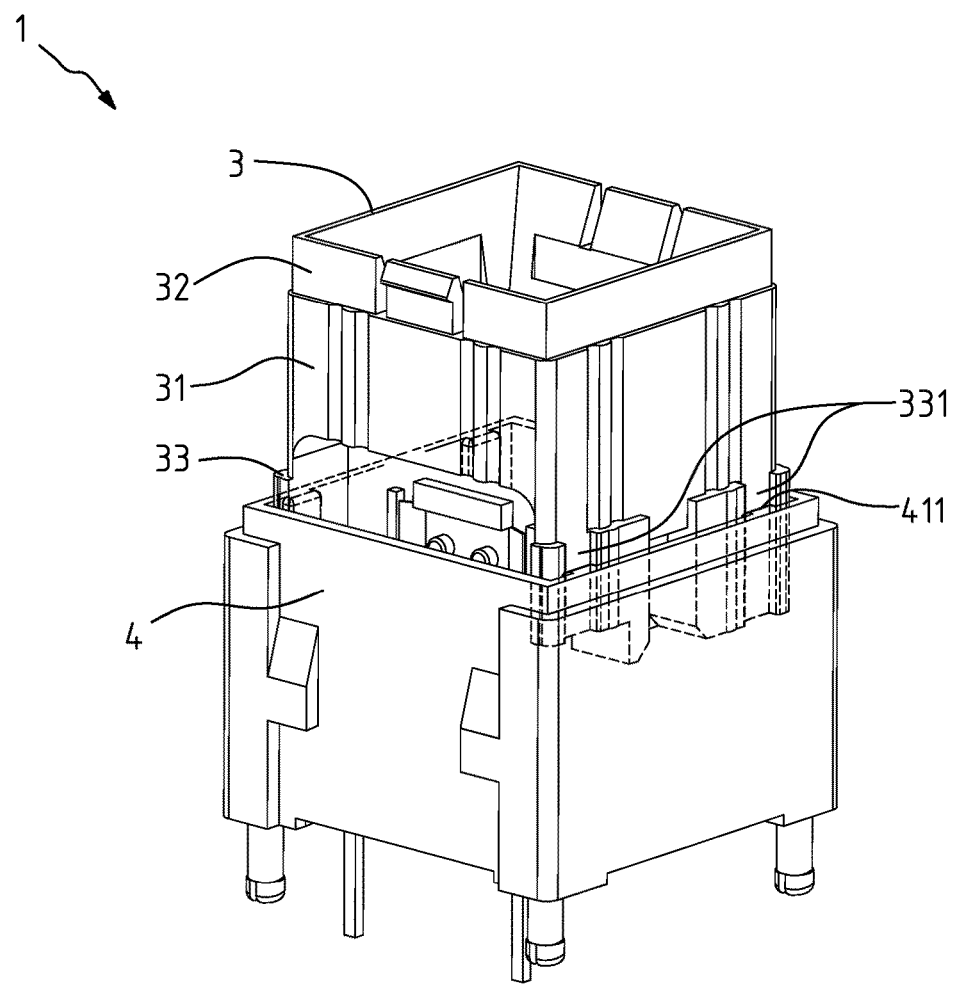
FIG. 4 is a schematic view of a movable stand mounted on the base according to the present invention.
Figure 5:
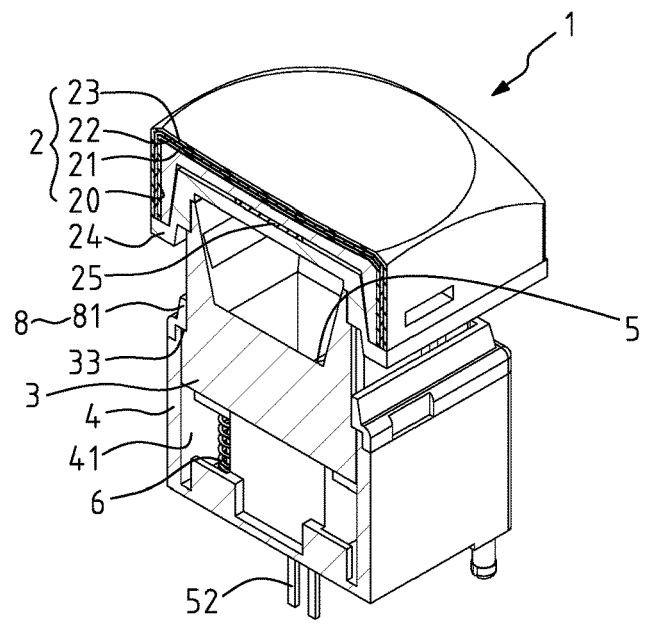
FIG. 5 is a cutaway view of the push switch not pushed according to the present invention.

Referring to FIG. 1 through FIG. 4, the present invention provides a push switch according to a preferred embodiment of the present invention. According to the present invention, a push switch 1 capable of indicating a push state comprises a cap 2, a movable stand 3, a base 4, a light-emitting module 5, two resilient components 6, a circuit unit 7, and a casing 8. The cap 2 is made of a light-penetrable material and comprises a surface layer 20 on which a first UV ink layer 21, a translucent chromium-plated layer 22, and a second UV ink layer 23 are disposed sequentially (as shown in FIG. 5). Due to the intrinsic characteristics of the materials which they are made from, respectively, the first UV ink layer 21 and the second UV ink layer 23 enhance the luster, waterproofing, and wearproofing of the cap 2, render the cap 2 attractive, and are environment-friendly. Furthermore, UV ink is opaque so that elements inside the push switch 1 are invisible through the cap 2. The translucent chromium-plated layer 22 is plated with chromium to reinforce the cap 2.

Figure 2:
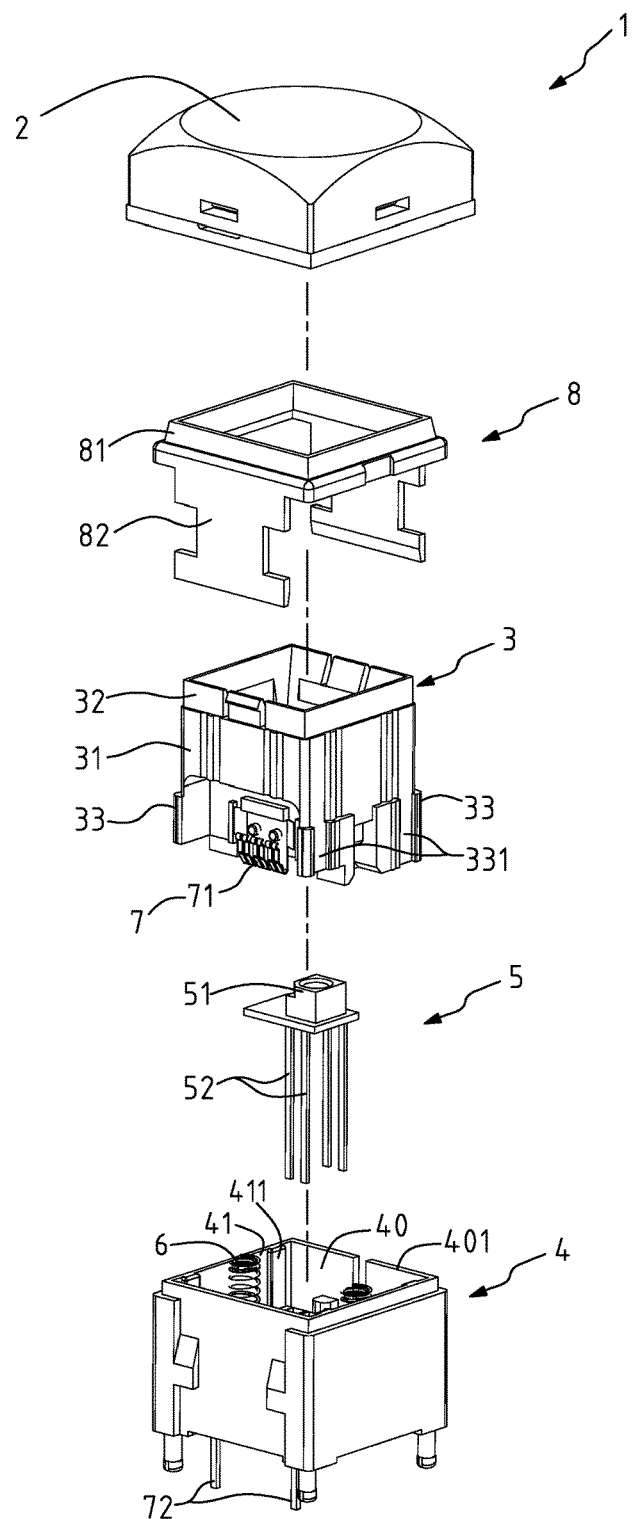
FIG. 2 is a partial exploded view of the push switch shown in FIG. 1.

Referring to FIG. 2, the movable stand 3 has therein a hollow core and comprises a body 31, a connecting end portion 32 disposed at one end of the body 31, and a limiting portion 33 disposed at the other end of the body 31. The connecting end portion 32 connects with the cap 2. The limiting portion 33 is integrally formed with the body 31 and disposed below the body 31 to extend laterally from the outer surface of the body 31. The limiting portion 33 comprises guide grooves 331. The guide grooves 331 are each concavely formed on the limiting portion 33 to longitudinally penetrate the top and bottom of the limiting portion 33. The guide grooves 33 are each flush with the outer surface of the body 31. In the preferred embodiment, two guide grooves 331 are disposed on each of at least two opposing sides of the limiting portion 33 and spaced apart.

Figure 1:
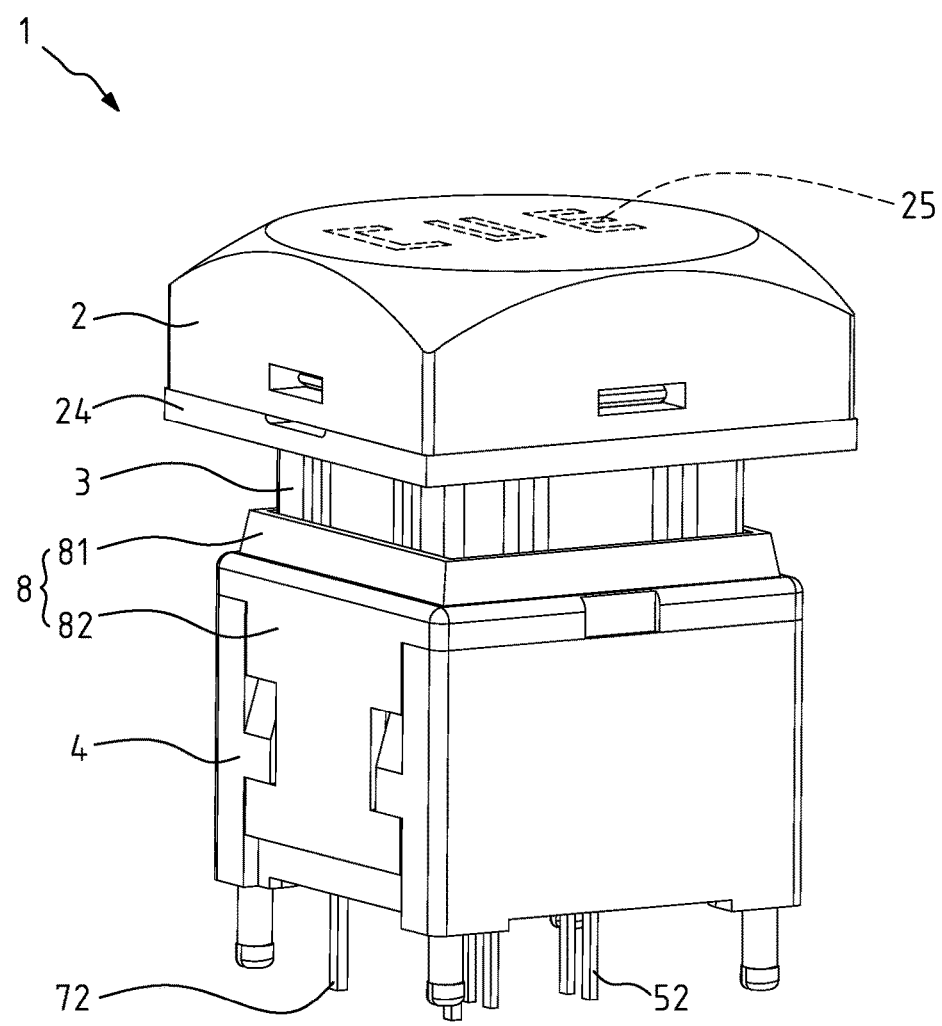
FIG. 1 is a perspective view of an assembled push switch capable of indicating a push state according to the present invention.

Referring to FIG. 3, the base 4 has therein a receiving space 40. The receiving space 40 has one end at which an opening 401 is disposed. The light-emitting module 5, the two resilient components 6, and the circuit unit 7 are disposed in the receiving space 40. Each resilient component 6 has one end pressing against the bottom of the movable stand 3 and the other end pressing against the bottom of the base 4 (as shown in FIG. 5). Posts 411 are disposed on an inner wall surface 41 of the base 4 and correspond in position to the guide grooves 331, respectively. The posts 411 on the inner wall surface 41 extend longitudinally to the top and bottom of the base 4. The guide grooves 331 connect slidably with the posts 411. As soon as the cap 2 is pushed, the movable stand 3 presses on the resilient components 6 and moves downward. Meanwhile, the engagement (as shown in FIG. 4) between the guide grooves 331 disposed longitudinally on the limiting portion 33 and the posts 411 of the base 4 not only ensures that the movable stand 3 moves vertically up and down, but also ensures that, regardless of where on the cap 2 a push is exerted, the movable stand 3 does not end up in a diversion which might otherwise undermine smooth motion of the movable stand 3 and cause the push switch 1 to turn on imprecisely. Referring to FIG. 1, FIG. 2 and FIG. 5, a light-penetrable connecting member 24 is fitted inside the cap 2 to connect the cap 2 to the connecting end portion 32 of the movable stand 3. The connecting member 24 is disposed above the receiving space 40 in a manner to not only reinforce the cap 2, but also conceal the receiving space 40 fully so that elements inside the base 4 will be invisible even if light is emitted from inside the push switch 1.

Referring to FIG. 2, the light-emitting module 5 comprises at least one light-emitting component 51 and conductive terminals 52 and is electrically connected to an external circuit board (not shown). In the preferred embodiment, the at least one light-emitting component 51 is a light-emitting diode. The at least one light-emitting component 51 emits light as soon as the conductive terminals 52 are on or the push switch 1 is pushed.

Figure 6:
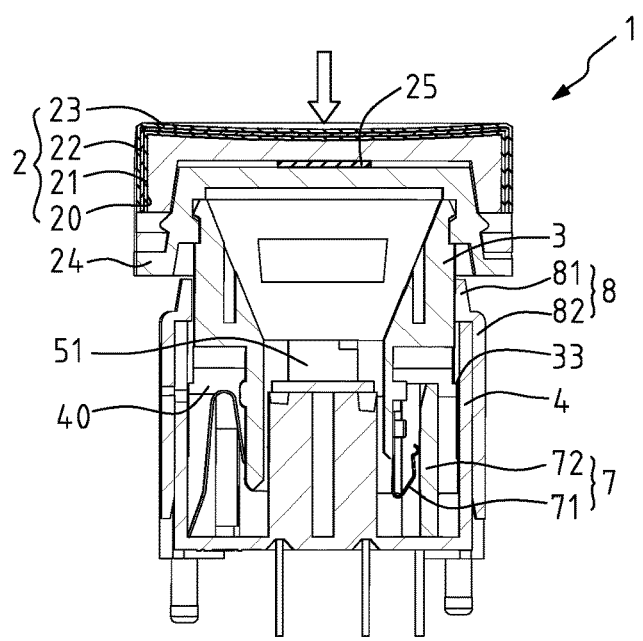
FIG. 6 is a cross-sectional view of the push switch pushed according to the present invention.

Referring to FIG. 2 and FIG. 3, the circuit unit 7 comprises a contact terminal group 71 and a signal terminal group 72. The contact terminal group 71 is disposed on the movable stand 3 and comprises contact terminals. The signal terminal group 72 is disposed in the receiving space 40 of the base 4 and comprises signal terminals. The signal terminal group 72 is electrically connected to the external circuit board. As soon as the movable stand 3 moves into the receiving space 40, the contact terminal group 71 is moved and thus comes into contact with the signal terminal group 72 (as shown in FIG. 6); hence, the circuit unit 7 turns on and sends an electrical signal for controlling at least one application end product (not shown) or starting/stopping the light emission of the at least one light-emitting component 51.

Referring to FIG. 1 and FIG. 2, the casing 8 comprises a frame portion 81 and securing walls 82 which extend from the bottom of the frame portion 81. The top of the frame portion 81 tapers and extends to above the receiving space 40. The casing 8 is fitted onto the base 4 so that the frame portion 81 corresponds in position to an opening 401 of the base 4. In a preferred embodiment, the securing walls 82 are engaged with corresponding wall surfaces of the base 4 by an engaging mechanism.

Referring to FIG. 5, before the push switch 1 of the present invention is pushed, the limiting portion 33 of the movable stand 3 presses against the bottom edge of the frame portion 81 through the resilient components 6 to limit the longitudinal motion of the movable stand 3. As shown in FIG. 6, after the cap 2 has been pushed and the contact terminal group 71 of the circuit unit 7 has come into electrical contact with the signal terminal group 72, the push switch 1 is turned on, whereas light emitted from the at least one light-emitting component 51 is visible through the cap 2 so that a user can easily identify the push state of the push switch 1. Furthermore, with the guide grooves 331 being flush with the outer surface of the body 31 (as shown in FIG. 4), the body 31 of the movable stand 3 moving enters and exits the receiving space 40 smoothly. In another preferred embodiment, a picture layer 25 (shown in FIGS. 5, 6) is disposed between the cap 2 and the connecting member 24 and displays a picture, a word, or a combination thereof. The picture layer 25 is an independent light-penetrable film or is formed on the top surface of the connecting member 24 by laser marking or by printing; hence, a picture or word of the picture layer 25 is visible through the cap 2 because of the light emitted from the at least one light-emitting component 51 (as shown in FIG. 1) and indicative of the push state of the push switch 1 or a corresponding one of functions of the push switch 1. When the at least one light-emitting component 51 does not emit light, the picture layer 25 is invisible through the cap 2.

Figure 7:
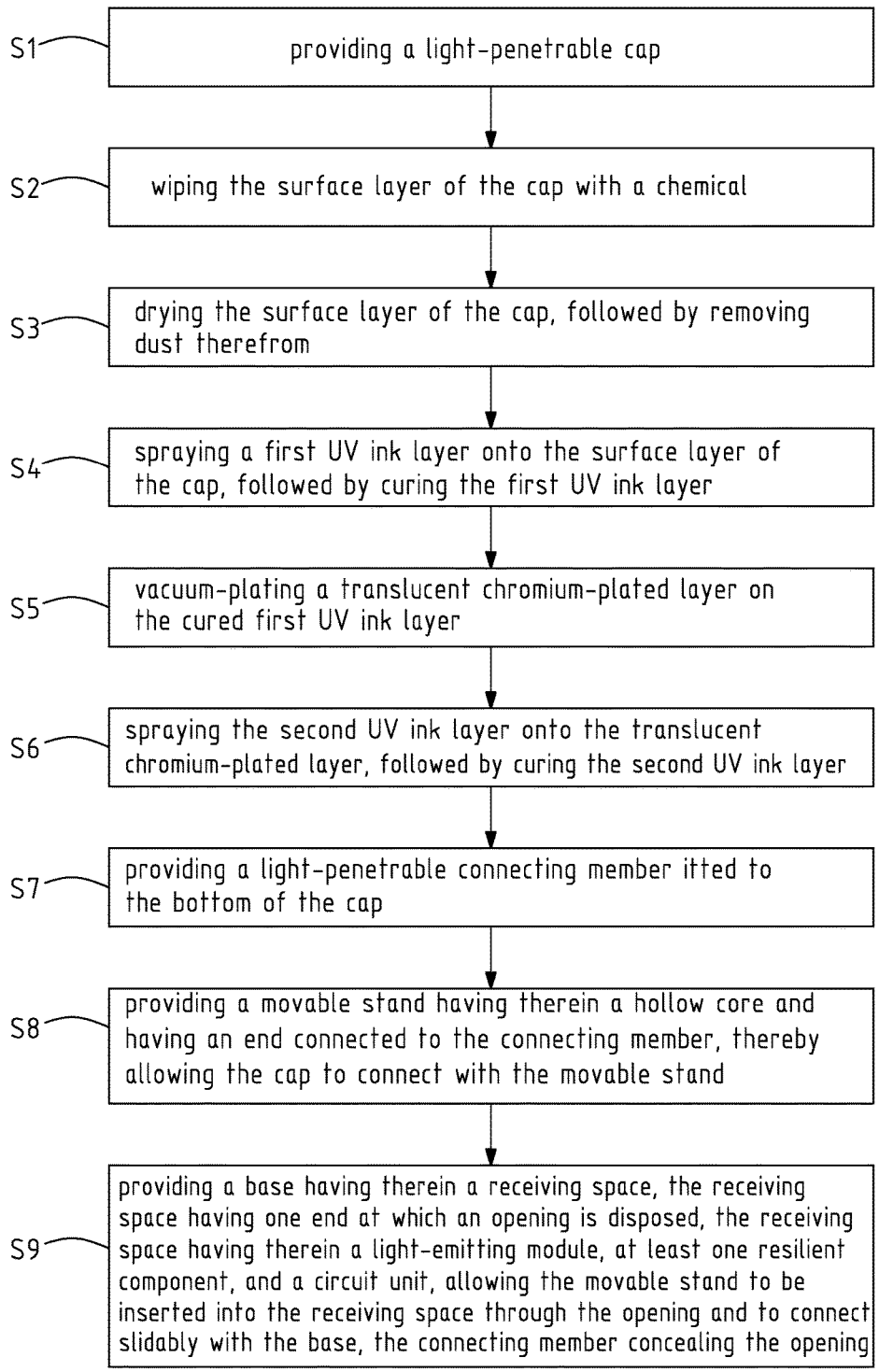
FIG. 7 is a schematic view of the process flow of a method of manufacturing a push switch capable of indicating a push state according to the present invention.

Referring to FIG. 7, there is shown a schematic view of the process flow of a method of manufacturing the push switch 1 capable of indicating a push state according to the present invention. As shown in the diagram, the method comprises: (step S1) providing a light-penetrable cap 2; (step S2) wiping the surface layer 20 of the cap 2 with a chemical, wherein the chemical is naphtha and thus contains n-hexane; (step S3) drying the surface layer 20 of the cap 2, followed by removing dust therefrom; (step S4) spraying a first UV ink layer 21 onto the surface layer 20 of the cap 2, followed by curing the first UV ink layer 21; (step S5) vacuum-plating a translucent chromium-plated layer 22 on the cured first UV ink layer 21; (step S6) spraying the second UV ink layer 23 onto the translucent chromium-plated layer 22, followed by curing the second UV ink layer 23; (step S7) providing a light-penetrable connecting member 24 fitted to the bottom of the cap 2; (step S8) providing a movable stand 3 having therein a hollow core and having an end connected to the connecting member 24, thereby allowing the cap 2 to connect with the movable stand 3; and (step S9) providing a base 4 having therein a receiving space 40, the receiving space 40 having one end at which an opening 401 is disposed, the receiving space 40 having therein a light-emitting module 5, at least one resilient component 6, and a circuit unit 7, allowing the movable stand 3 to be inserted into the receiving space 40 through the opening 401 and to connect slidably with the base 4, the connecting member 24 concealing the opening 401. According to the present invention, a translucent light-penetrable film is formed on the surface layer 20 of the cap 2 by three spraying processes. The translucent chromium-plated layer 22 is formed between the first UV ink layer 21 and the second UV ink layer 23 to receive concealing protection provided by the UV ink layers and thus is wearproof. The UV ink layers are cured to form glossy surfaces conducive to enhancement of a sense of touch associated with a push.

In conclusion, the push switch 1 of the present invention is characterized in that: the first UV ink layer 21, the translucent chromium-plated layer 22, and the second UV ink layer 23 are formed on the surface layer 20 sequentially by three spraying processes, respectively; the cap 2 is coupled to the connecting member 24 so that light emitted from the at least one light-emitting component 51 in the base 4 is visible through the cap 2 and thus to allow the picture layer to be visible as well; the brightness of the light emitted and visible is greatly enhanced because of the luster of the translucent chromium-plated layer 22; and elements inside the base 4 are invisible through the cap 2 in the absence of any light emitted from the at least one light-emitting component 51.

It is understood that the invention may be embodied in other forms within the scope of the claims. Thus the present examples and embodiments are to be considered in all respects as illustrative, and not restrictive, of the invention defined by the claims.

What is claimed is:

1. A method of manufacturing a push switch capable of indicating a push state, the method comprising the steps of:
   providing a light-penetrable cap;
   wiping a surface layer of the cap with a chemical;
   drying the surface layer of the cap, followed by removing dust therefrom;
   spraying a first UV ink layer onto the surface layer of the cap, followed by curing the first UV ink layer;
   vacuum-plating a translucent chromium-plated layer on the cured first UV ink layer;
   spraying a second UV ink layer onto the translucent chromium-plated layer, followed by curing the second UV ink layer;
   providing a light-penetrable connecting member fitted to a bottom of the cap;
   providing a movable stand having therein a hollow core and having an end connected to the connecting member, thereby allowing the cap to connect with the movable stand; and
   providing a base having therein a receiving space, the receiving space having an end at which an opening is disposed, the receiving space having therein a light-emitting module, at least one resilient component, and a circuit unit, allowing the movable stand to be inserted into the receiving space through the opening and to connect slidably with the base, the connecting member concealing the opening;
   wherein, as soon as the cap is pushed, the movable stand presses on the at least one resilient component and moves downward to turn on the circuit unit and enable at least one light-emitting component of the light-emitting module to emit light visible through the cap and indicative of a push state of the push switch.

2. The method of claim 1, wherein a picture layer is disposed between the cap and the connecting member and displays at least one picture or word which is visible through the cap because of the light emitted from the at least one light-emitting component and light penetrability of both the connecting member and the cap, and the picture layer is invisible through the cap when the at least one light-emitting component does not emit light.

3. The method of claim 1, wherein the movable stand comprises a body, a connecting end portion disposed at an end of the body, and a limiting portion disposed at another end of the body, the limiting portion extending laterally from the body and being disposed in the receiving space, the connecting end portion connecting with the connecting member, with the base fitted to a casing which comprises a frame portion and securing walls extending out of the frame portion, the frame portion being disposed at the opening so that the limiting portion of the movable stand presses against a bottom edge of the frame portion through the at least one resilient component.

4. The method of claim 3, wherein the limiting portion comprises guide grooves each concavely formed on the limiting portion to longitudinally penetrate a top and bottom of the limiting portion, wherein posts are disposed on an inner wall surface of the base, correspond in position to the guide grooves, respectively, and extend longitudinally to a top and bottom of the base, with the guide grooves connecting slidably with the posts.

5. A push switch capable of indicating a push state, comprising:
- a cap being light-penetrable and comprising a surface layer, a first UV ink layer, a translucent chromium-plated layer, and a second UV ink layer, wherein the first UV ink layer, the translucent chromium-plated layer, and the second UV ink layer are sprayed onto the surface layer sequentially;
- a base having therein a receiving space, the receiving space having an end at which an opening is disposed;
- a connecting member fitted to a bottom of the cap, being light-penetrable, and concealing the opening of the receiving space fully;
- a movable stand comprising a body, a connecting end portion disposed at an end of the body, and a limiting portion disposed at another end of the body, the limiting portion extending laterally from the body and being disposed in the receiving space, the connecting end portion connecting with the connecting member, allowing the movable stand to move as soon as the cap is pushed;
- a light-emitting module disposed in the receiving space of the base, comprising at least one light-emitting component and conductive terminals;
- at least one resilient component disposed in the receiving space of the base, having another end pressing against a bottom of the base; and
- a circuit unit disposed in the receiving space of the base, and adapted to turn on the push switch as a result of motion of the movable stand, control at least one application end product, and enable the at least one light-emitting component to emit light, wherein the light thus emitted is visible through the cap.

6. The push switch of claim 5, wherein a picture layer is disposed between the cap and the connecting member and displays at least one picture or word which is visible through the cap because of the light emitted from the at least one light-emitting component and light penetrability of both the connecting member and the cap, and the picture layer is invisible through the cap when the at least one light-emitting component does not emit light.

7. The push switch of claim 5, further comprising a casing which comprises a frame portion and securing walls extending out of the frame portion, with the base fitted to the casing, so that the frame portion is disposed at the opening, and the limiting portion of the movable stand presses against a bottom edge of the frame portion through the at least one resilient component.

8. The push switch of claim 5, wherein the translucent chromium-plated layer is sprayed onto the first UV ink layer by vacuum-plating.

9. The push switch of claim 5, wherein the limiting portion of the movable stand comprises guide grooves each concavely formed on the limiting portion to longitudinally penetrate a top and bottom of the limiting portion, wherein posts are disposed on an inner wall surface of the base, correspond in position to the guide grooves, respectively, and extend longitudinally to a top and bottom of the base, with the guide grooves connecting slidably with the posts.

10. The push switch of claim 9, wherein the guide grooves of the limiting portion are each flush with an outer surface of the body so that the body of the movable stand moving enters and exits the receiving space smoothly.

\* \* \* \* \*